US00RE48620E

(19) United States
(12) Reissued Patent
Li et al.

(10) Patent Number: US RE48,620 E
(45) Date of Reissued Patent: Jul. 6, 2021

(54) TROFFER-STYLE FIXTURE

(71) Applicant: Ideal Industries Lighting LLC, Durham, NC (US)

(72) Inventors: Chi Man Chris Li, N.T. (HK); Chi Hoi Felix Mung, Kowloon (HK); Ho Ching Gauss So, Kowloon (HK); Wai To Yan, N.T. (HK)

(73) Assignee: IDEAL Industries Lighting LLC, Racine, WI (US)

(21) Appl. No.: 29/720,033

(22) Filed: Jan. 9, 2020

Related U.S. Patent Documents

Reissue of:
(64) Patent No.: Des. 807,556
Issued: Jan. 9, 2018
Appl. No.: 29/525,657
Filed: Apr. 30, 2015

U.S. Applications:
(63) Continuation-in-part of application No. 29/481,156, filed on Feb. 2, 2014, now Pat. No. Des. 772,465,
(Continued)

(51) LOC (13) Cl. ..... 26-05
(52) U.S. Cl.
USPC ..... D26/74
(58) Field of Classification Search
USPC ..... D26/72, 74, 75, 76, 77, 78, 79, 85, 88, D26/89, 118, 138, 141
(Continued)

(56) References Cited

U.S. PATENT DOCUMENTS

D85,382 S 10/1931 Guth ..... D26/24
2,356,654 A 8/1944 Cullman ..... 200/84 C
(Continued)

FOREIGN PATENT DOCUMENTS

CN 1762061 4/2006
CN 1934389 3/2007
(Continued)

OTHER PUBLICATIONS

Cree LR24 Product Specification, www.cree.com/lighting.
(Continued)

*Primary Examiner* — Philip S Hyder
(74) *Attorney, Agent, or Firm* — Withrow & Terranova, P.L.L.C.

(57) CLAIM

The ornamental design for a troffer-style fixture, as shown and described herein.

DESCRIPTION

FIG. 1 is a top perspective view of a light fixture according to an embodiment of the present invention.
FIG. 2 is a bottom perspective view of a light fixture according to an embodiment of the present invention.
FIG. 3 is a front elevation view of a light fixture according to an embodiment of the present invention.
FIG. 4 is a right side elevation view of a light fixture according to an embodiment of the present invention.
FIG. 5 is a rear elevation view of a light fixture according to an embodiment of the present invention.
FIG. 6 is a left side elevation view of a light fixture according to an embodiment of the present invention.
FIG. 7 is a top plan view of a light fixture according to an embodiment of the present invention; and,
FIG. 8 is a bottom plan view of a light fixture according to an embodiment of the present invention.
Elements of the fixtures in the attached figures are in broken lines for illustrative purposes only and form no part of the claimed design.

1 Claim, 6 Drawing Sheets

Figure 2:
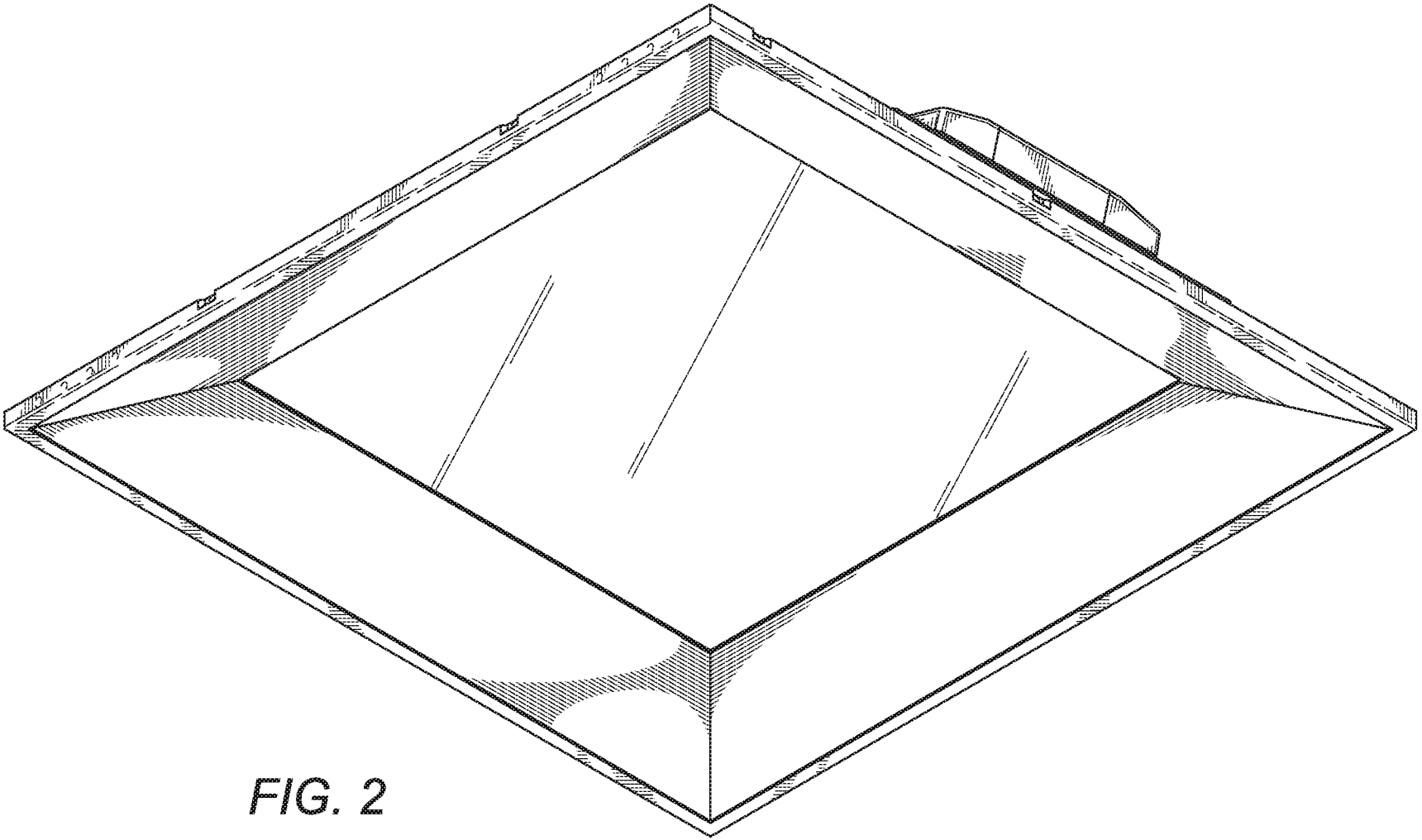
Figure 3:
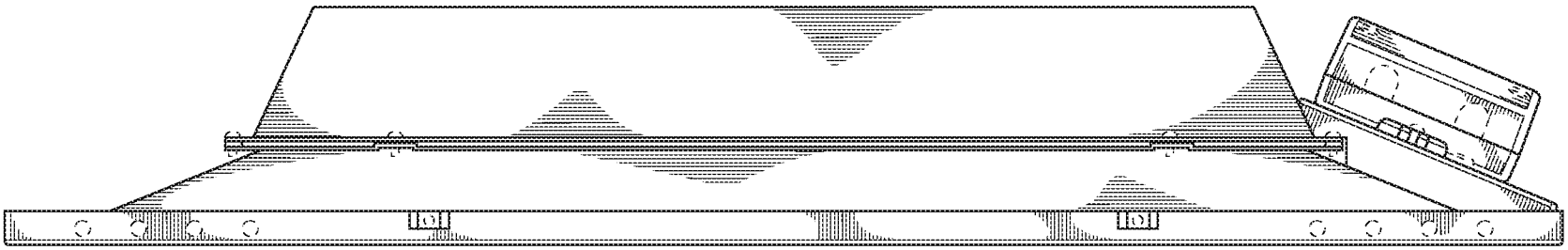
Figure 4:
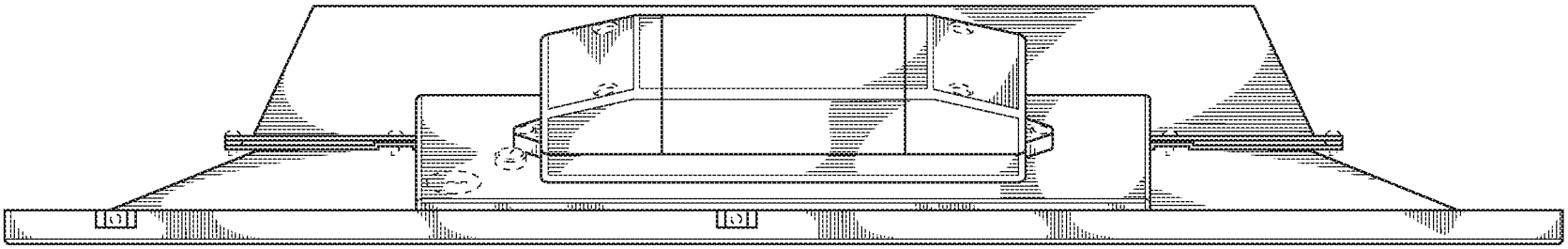
Figure 5:
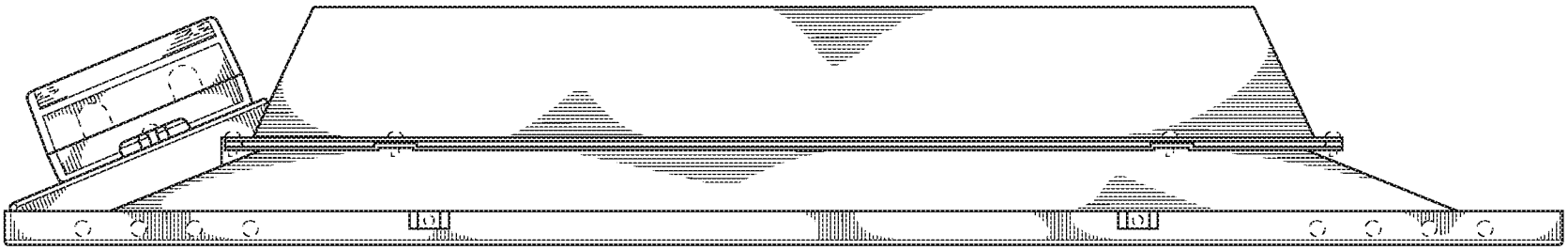
Figure 6:
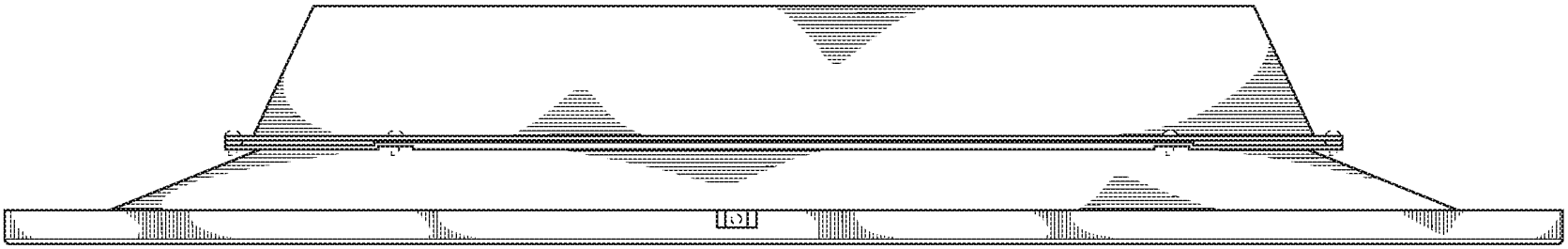
Figure 7:
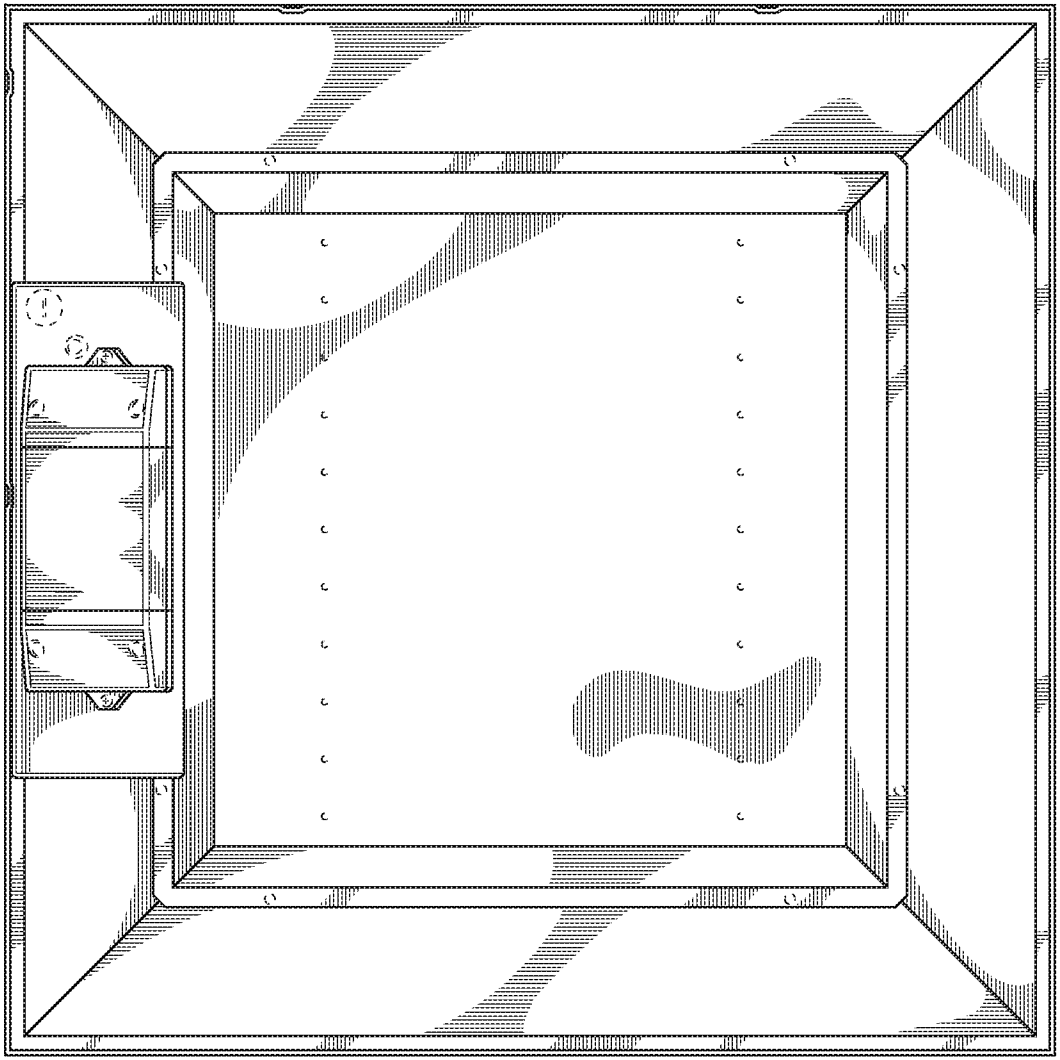
Figure 8:
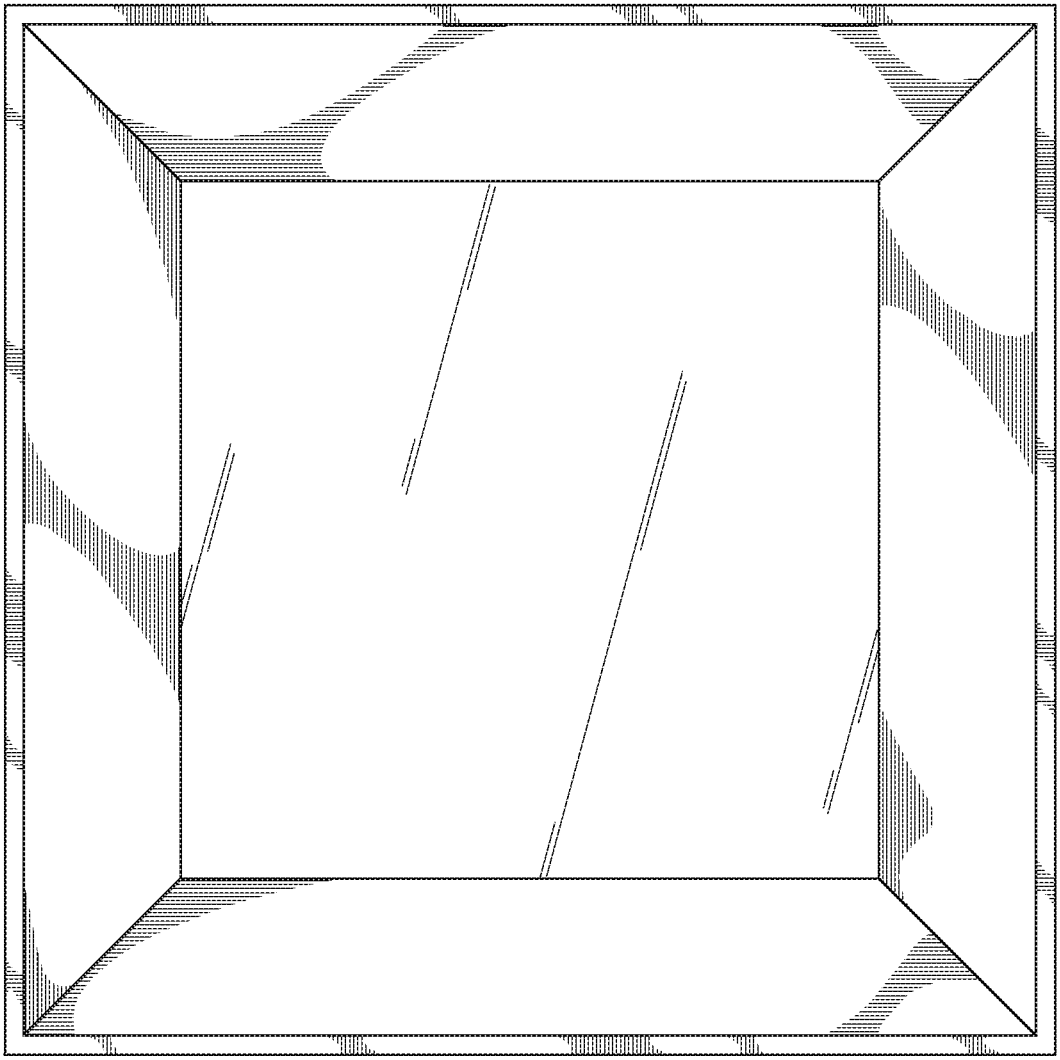

Matter enclosed in heavy brackets [ ] appears in the original patent but forms no part of this reissue; matter printed in italics indicates the additions made by reissue.

*(AMENDED)*

Related U.S. Application Data which is a continuation-in-part of application No. 14/170,627, filed on Feb. 2, 2014, now Pat. No. 10,451,253.

(58) Field of Classification Search

CPC ..... F21V 29/2262; F21V 7/06; F21V 21/044; F21V 21/047; F21V 29/2212; F21V 29/2225; F21V 29/2256; F21V 29/225; F21V 29/2268; F21Y 2111/002; F21S 8/02; F21S 8/026

See application file for complete search history.

(56) References Cited

U.S. PATENT DOCUMENTS 3,381,124 A 4/1968 Eisenberg ..... 362/354
3,743,826 A 7/1973 Halfaker
4,939,627 A 7/1990 Herst et al. ..... 362/299
5,025,356 A 6/1991 Gawad ..... 362/221
5,526,190 A 6/1996 Hubble, III ..... 347/102
5,823,663 A 10/1998 Bell et al. ..... 362/362
D407,473 S 3/1999 Wimbock ..... D23/328
6,079,851 A 6/2000 Altman
6,102,550 A 8/2000 Edwards, Jr.
6,149,283 A 11/2000 Conway et al. ..... 362/236
6,155,699 A 12/2000 Miller et al. ..... 362/293
6,210,025 B1 4/2001 Schmidt et al. ..... 362/362
6,234,643 B1 5/2001 Lichon, Jr. ..... 362/147
6,402,347 B1 6/2002 Maas et al. ..... 362/294
6,523,974 B2 2/2003 Engel ..... 362/224
6,578,979 B2 6/2003 Truttmann-Battig ..... 362/92
6,598,998 B2 7/2003 West ..... 257/E33.073
D496,121 S 9/2004 Santoro ..... D26/74
6,871,983 B2 3/2005 Jacob et al. ..... 362/364
6,948,838 B2 9/2005 Kunstler ..... 362/237
6,951,415 B2 10/2005 Amano ..... 362/297
7,021,797 B2 4/2006 Minano et al. ..... 362/355
7,049,761 B2 5/2006 Timmermans et al. ..... 315/246
7,063,449 B2 6/2006 Ward ..... 345/102
7,109,880 B2 * 9/2006 Sibalich ..... F21S 8/02 340/693.5
7,111,969 B2 9/2006 Bottesch ..... 362/299
7,175,296 B2 2/2007 Cok ..... 362/147
7,213,940 B1 5/2007 Van De Ven et al. ..... 362/231
7,217,004 B2 5/2007 Park ..... 362/240
7,237,924 B2 7/2007 Martineau et al. ..... 362/231
D556,358 S 11/2007 Santoro ..... D26/74
7,338,182 B1 3/2008 Hastings et al. ..... 362/150
7,341,358 B2 3/2008 Hsieh ..... 362/97.1
7,510,299 B2 3/2009 Timmermans et al. ..... 362/225
7,520,636 B2 4/2009 Van Der Poel ..... 362/290
D593,246 S 5/2009 Fowler et al. ..... D26/76
7,559,672 B1 7/2009 Parkyn et al. ..... 362/244
7,594,736 B1 9/2009 Kassay et al. ..... 362/225
D604,446 S 11/2009 Fowler et al. ..... D26/76
7,618,157 B1 11/2009 Galvez et al. ..... 362/294
7,618,160 B2 11/2009 Chinniah et al. ..... 362/326
D608,932 S 1/2010 Castelli ..... D26/76
7,654,688 B2 2/2010 Li
7,654,702 B1 2/2010 Ding et al.
7,661,844 B2 2/2010 Sekiguchi et al. ..... 362/249.02
D611,183 S 3/2010 Duarte ..... D26/76
7,674,005 B2 3/2010 Chung et al. ..... 362/223
7,686,470 B2 3/2010 Chiang ..... 362/147
7,686,484 B2 3/2010 Heiking et al. ..... 362/375
7,712,918 B2 5/2010 Siemiet et al. ..... 362/241
7,722,220 B2 5/2010 Van De Ven ..... 362/294
7,722,227 B2 5/2010 Zhang et al. ..... 362/364
D617,487 S 6/2010 Fowler et al. ..... D26/76
7,768,192 B2 8/2010 Van De Ven et al. ..... 313/503
7,815,338 B2 10/2010 Siemiet et al. ..... 362/218
D628,335 S * 11/2010 Hyland ..... D26/74
7,824,056 B2 11/2010 Madireddi et al. ..... 362/125
7,828,468 B2 11/2010 Mayfield et al. ..... 362/342
D632,007 S * 2/2011 Kim ..... D26/120
D633,247 S 2/2011 Kong et al. ..... D26/88
7,922,354 B2 4/2011 Everhart ..... 362/235
7,926,982 B2 4/2011 Liu ..... 362/294
7,959,332 B2 6/2011 Tickner
7,988,321 B2 8/2011 Wung et al. ..... 362/218
7,988,335 B2 8/2011 Liu et al. ..... 362/294
7,991,257 B1 8/2011 Coleman ..... 264/1.24
7,993,034 B2 8/2011 Wegner ..... 362/296.05
8,038,314 B2 10/2011 Ladewig
8,038,321 B1 10/2011 Franck et al. ..... 362/249.02
8,058,659 B2 11/2011 Bisberg
8,070,326 B2 12/2011 Lee ..... 362/307
D653,376 S 1/2012 Kong et al. ..... D26/76
8,092,043 B2 1/2012 Lin et al. ..... 362/249.02
8,092,049 B2 1/2012 Kinnune et al. ..... 362/294
8,096,671 B1 1/2012 Cronk ..... 362/147
D657,488 S 4/2012 Lown et al. ..... D26/120
8,162,504 B2 4/2012 Zhang et al. ..... 362/217
8,186,855 B2 5/2012 Wassel et al. ..... 362/373
8,197,086 B2 6/2012 Watanabe et al. ..... 362/218
8,201,968 B2 6/2012 Maxik et al.
D663,881 S * 7/2012 Janssen ..... D26/74
8,215,799 B2 7/2012 Vanden Eynden et al. ..... 362/294
8,246,219 B2 8/2012 Teng ..... 362/217.02
8,256,927 B2 9/2012 Hu ..... 362/218
8,287,160 B2 10/2012 Shen
D670,849 S 11/2012 Lay et al. ..... D26/74
8,317,354 B2 11/2012 Gassner et al. ..... 362/147
D675,369 S * 1/2013 Michaud ..... D26/118
D677,418 S * 3/2013 Wilson ..... D26/74
D677,821 S * 3/2013 Jeon ..... D26/74
D679,848 S 4/2013 Pickard et al. ..... D26/74
D679,849 S * 4/2013 Ham ..... D26/74
8,410,514 B2 4/2013 Kim ..... 257/99
D684,291 S 6/2013 Goelz et al. ..... D26/74
D690,868 S * 10/2013 Mayfield, III ..... D26/74
D690,875 S * 10/2013 McKenzie ..... D26/118
8,556,452 B2 10/2013 Simon ..... 362/217.07
D693,952 S * 11/2013 Soni ..... D26/74
8,591,058 B2 11/2013 Concepcion ..... 362/231
8,591,071 B2 11/2013 Hochstein ..... 362/294
8,602,601 B2 12/2013 Khazi
8,616,723 B2 12/2013 Zhang ..... 362/218
D698,969 S * 2/2014 Johns ..... D26/74
D698,974 S * 2/2014 Aniserowicz ..... D26/74
D698,975 S 2/2014 Blessitt et al. ..... D26/74
8,641,243 B1 2/2014 Rashidi ..... 362/373
D701,988 S 4/2014 Clements ..... D26/74
D702,393 S * 4/2014 Ansierowicz ..... D26/89
D702,868 S * 4/2014 Patel ..... D26/74
8,696,154 B2 4/2014 Hutchens ..... 362/217.05
8,702,264 B1 4/2014 Rashidi ..... 362/147
8,764,244 B2 7/2014 Jeon ..... 362/218
D714,988 S 10/2014 Park et al. ..... D26/74
D721,198 S 1/2015 Glasbrenner ..... D26/76
D725,819 S * 3/2015 Reynolds ..... D26/118
9,010,956 B1 4/2015 Davis
9,052,075 B2 6/2015 Demuynck et al.
D747,529 S * 1/2016 Yoon ..... D26/74
D750,312 S * 2/2016 Reynolds ..... D26/118
D750,313 S * 2/2016 Reynolds ..... D26/118
D766,497 S * 9/2016 Salomon ..... D26/138
D772,465 S * 11/2016 Li ..... D26/74
9,494,294 B2 * 11/2016 Edmond ..... F21S 8/06
D786,477 S * 5/2017 Lauderdale ..... D26/76
D786,489 S * 5/2017 Stanley ..... D26/118
D786,491 S * 5/2017 Reynolds ..... D26/118
2003/0063476 A1 4/2003 English et al.
2004/0001344 A1 1/2004 Hecht ..... 362/555
2004/0085779 A1 5/2004 Pond et al. ..... 362/516
2004/0100796 A1 5/2004 Ward
2004/0240230 A1 12/2004 Kitajima ..... 362/558
2005/0180135 A1 8/2005 Mayer ..... 362/240
2005/0264716 A1 12/2005 Kim et al.
2005/0281023 A1 12/2005 Gould ..... 362/217
2006/0221611 A1 10/2006 Noh et al. ..... 362/247
2006/0262521 A1 11/2006 Piepgras et al. ..... 362/149
2006/0291206 A1 12/2006 Angelini et al. ..... 362/244

(56) References Cited

U.S. PATENT DOCUMENTS

| | | | | |
|---|---|---|---|---|
| 2007/0070625 | A1 | 3/2007 | Bang | 362/240 |
| 2007/0109779 | A1 | 5/2007 | Sekiguchi et al. | |
| 2007/0115670 | A1 | 5/2007 | Roberts et al. | |
| 2007/0115671 | A1 | 5/2007 | Roberts et al. | |
| 2007/0211457 | A1 | 9/2007 | Mayfield et al. | 362/223 |
| 2007/0253205 | A1 | 11/2007 | Welker | 362/373 |
| 2007/0297181 | A1 | 12/2007 | Mayfield et al. | 362/342 |
| 2008/0019147 | A1 | 1/2008 | Erchak | 362/607 |
| 2008/0037284 | A1 | 2/2008 | Rudisill | 362/629 |
| 2008/0049422 | A1 | 2/2008 | Trenchard et al. | 362/238 |
| 2008/0232093 | A1 | 9/2008 | Kim | 362/147 |
| 2008/0278943 | A1 | 11/2008 | Van Der Poel | 362/240 |
| 2009/0034247 | A1 | 2/2009 | Boyer | 362/225 |
| 2009/0073693 | A1 | 3/2009 | Nall | 362/249.02 |
| 2009/0161356 | A1 | 6/2009 | Negley et al. | 362/231 |
| 2009/0168439 | A1 | 7/2009 | Chiang | 362/404 |
| 2009/0196024 | A1 | 8/2009 | Heiking et al. | 362/150 |
| 2009/0225543 | A1 | 9/2009 | Jacobson et al. | |
| 2009/0237958 | A1 | 9/2009 | Kim | |
| 2009/0262543 | A1 | 10/2009 | Ho | 362/373 |
| 2009/0296388 | A1 | 12/2009 | Wu et al. | 362/235 |
| 2009/0310354 | A1 | 12/2009 | Zampini et al. | 362/235 |
| 2009/0323334 | A1 | 12/2009 | Roberts et al. | |
| 2010/0061108 | A1 | 3/2010 | Zhang et al. | 362/364 |
| 2010/0097794 | A1 | 4/2010 | Teng et al. | 362/231 |
| 2010/0103678 | A1 | 4/2010 | Van de Ven et al. | 362/294 |
| 2010/0110679 | A1 | 5/2010 | Teng et al. | |
| 2010/0172133 | A1 | 7/2010 | Liu | 362/235 |
| 2010/0177532 | A1 | 7/2010 | Simon et al. | 362/555 |
| 2010/0188609 | A1 | 7/2010 | Matsuki et al. | |
| 2010/0253591 | A1 | 10/2010 | Hwu et al. | 345/1.3 |
| 2010/0254128 | A1 | 10/2010 | Pickard et al. | 362/231 |
| 2010/0254145 | A1 | 10/2010 | Yamaguchi | |
| 2010/0254146 | A1 | 10/2010 | McCanless | |
| 2010/0270903 | A1 | 10/2010 | Jao et al. | 313/46 |
| 2010/0271843 | A1 | 10/2010 | Holten et al. | 362/609 |
| 2010/0277905 | A1 | 11/2010 | Janik et al. | 362/235 |
| 2010/0277934 | A1 | 11/2010 | Oquendo, Jr. | 362/433 |
| 2010/0295468 | A1 | 11/2010 | Pedersen et al. | 315/294 |
| 2010/0302778 | A1 | 12/2010 | Dabiet | |
| 2010/0327768 | A1 | 12/2010 | Kong et al. | 315/294 |
| 2011/0032714 | A1 | 2/2011 | Chang | 362/373 |
| 2011/0043132 | A1 | 2/2011 | Kim et al. | 362/235 |
| 2011/0141722 | A1 | 6/2011 | Acampora et al. | 362/218 |
| 2011/0141734 | A1 | 6/2011 | Li | 362/235 |
| 2011/0156584 | A1 | 6/2011 | Kim | 315/32 |
| 2011/0164417 | A1 | 7/2011 | Huang | 362/235 |
| 2011/0175533 | A1 | 7/2011 | Homan | 315/130 |
| 2011/0199005 | A1 | 8/2011 | Bretschneider et al. | |
| 2011/0199769 | A1 | 8/2011 | Bretschneider et al. | |
| 2011/0246146 | A1 | 10/2011 | Kauffman et al. | 703/2 |
| 2011/0255292 | A1 | 10/2011 | Shen | 362/311 |
| 2011/0267810 | A1 | 11/2011 | Higman et al. | 362/218 |
| 2011/0267823 | A1 | 11/2011 | Angelini et al. | 362/277 |
| 2011/0286225 | A1 | 11/2011 | Konishi | |
| 2011/0305024 | A1 | 12/2011 | Chang | 362/294 |
| 2012/0033420 | A1 | 2/2012 | Kim et al. | 362/235 |
| 2012/0038289 | A1 | 2/2012 | Jee et al. | 315/291 |
| 2012/0051041 | A1 | 3/2012 | Edmond et al. | 362/231 |
| 2012/0120658 | A1 | 5/2012 | Wilk | |
| 2012/0127714 | A1 | 5/2012 | Rehn | |
| 2012/0134146 | A1 | 5/2012 | Smith | 362/225 |
| 2012/0140442 | A1 | 6/2012 | Woo | 362/95 |
| 2012/0140461 | A1 | 6/2012 | Pickard | |
| 2012/0206926 | A9 | 8/2012 | Chou | |
| 2013/0235568 | A1 | 9/2013 | Green et al. | 362/218 |
| 2013/0242550 | A1 | 9/2013 | Suen | |
| 2013/0258652 | A1 | 10/2013 | Hsieh | 362/225 |
| 2014/0265930 | A1 | 9/2014 | Harris | 315/307 |
| 2015/0016100 | A1 | 1/2015 | Ishii | 362/223 |
| 2015/0159852 | A1* | 6/2015 | Dahlen | F21V 29/503 362/249.02 |

FOREIGN PATENT DOCUMENTS

| | | | |
|---|---|---|---|
| CN | 1963289 | | 5/2007 |
| CN | 1963289 | A | 5/2007 |
| CN | 101188261 | | 5/2008 |
| CN | 101660715 | | 3/2010 |
| CN | 101776254 | | 7/2010 |
| CN | 101776254 | A | 7/2010 |
| CN | 101790660 | | 7/2010 |
| CN | 101790660 | A | 7/2010 |
| CN | 102072443 | | 5/2011 |
| CN | 202580962 | | 12/2012 |
| DE | 102007030186 | | 1/2009 |
| DE | 202010001832 | | 7/2010 |
| EP | 1298383 | A2 | 2/2003 |
| EP | 1298383 | | 4/2003 |
| EP | 1357335 | | 10/2003 |
| EP | 1357335 | A2 | 10/2003 |
| EP | 1653254 | | 5/2006 |
| EP | 1737051 | | 12/2006 |
| EP | 1847762 | | 10/2007 |
| EP | 1847762 | A2 | 10/2007 |
| EP | 1860467 | | 11/2007 |
| EP | 2287520 | | 2/2011 |
| EP | 2287520 | A2 | 2/2011 |
| EP | 2290690 | | 3/2011 |
| EP | 2290690 | A2 | 3/2011 |
| EP | 2636945 | | 9/2013 |
| EP | 2636945 | A2 | 11/2013 |
| ER | 1653254 | | 3/2006 |
| GB | 774198 | | 5/1957 |
| JP | 1069809 | | 3/1998 |
| JP | 1069809 | | 10/1998 |
| JP | 2002344027 | | 11/2002 |
| JP | U3097327 | | 8/2003 |
| JP | 3097327 | | 1/2004 |
| JP | 2004140324 | | 5/2004 |
| JP | 2004345615 | | 12/2004 |
| JP | 2004345615 | A | 12/2004 |
| JP | 2006173624 | | 6/2006 |
| JP | 2008147044 | | 6/2008 |
| JP | 3151501 | U | 3/2009 |
| JP | 3151501 | | 6/2009 |
| JP | 2009295577 | | 12/2009 |
| JP | 2010103687 | | 5/2010 |
| JP | 2011018571 | | 1/2011 |
| JP | 2011018572 | | 1/2011 |
| JP | 2011018571 | | 8/2011 |
| JP | 2011018572 | | 8/2011 |
| JP | 2006173624 | | 6/2016 |
| TW | 200524186 | | 7/2005 |
| TW | 200524186 | A | 7/2005 |
| TW | 200914759 | | 4/2009 |
| TW | 200914759 | A | 4/2009 |
| TW | 201018826 | | 5/2010 |
| TW | 201018826 | A | 5/2010 |
| WO | WO 03102467 | | 11/2003 |
| WO | 03102467 | | 12/2003 |
| WO | 2009030233 | | 3/2009 |
| WO | 2009140761 | | 11/2009 |
| WO | WO 2009140761 | A1 | 11/2009 |
| WO | 2009157999 | | 12/2009 |
| WO | WO 2009157999 | A | 12/2009 |
| WO | WO 2009157999 | A1 | 12/2009 |
| WO | 2010024583 | | 3/2010 |
| WO | WO 2010024583 | A2 | 3/2010 |
| WO | 2010042216 | | 4/2010 |
| WO | WO 2010042216 | A2 | 4/2010 |
| WO | 2011074424 | | 6/2011 |
| WO | WO2011074424 | A1 | 6/2011 |
| WO | 2011096098 | | 8/2011 |
| WO | 2011098191 | | 8/2011 |
| WO | WO 2011096098 | A1 | 8/2011 |
| WO | 2011118991 | | 9/2011 |
| WO | WO 2011118991 | A2 | 9/2011 |
| WO | 2011140353 | | 11/2011 |

(56) References Cited

FOREIGN PATENT DOCUMENTS

| | | |
|---|---|---|
| WO | WO 2011140353 A2 | 11/2011 |
| WO | WO 03102467 | 12/2013 |

OTHER PUBLICATIONS

Office Action from U.S. Appl. No. 13/429,080, dated Sep. 1, 2015.
Office Action from U.S. Appl. No. 14/716,480, dated Sep. 24, 2015.
Office Action from U.S. Appl. No. 14/170,627, dated Oct. 5, 2015.
Office Action from U.S. Appl. No. 13/368,217, dated Oct. 8, 2015.
Office Action from U.S. Appl. No. 13/464,745, dated Oct. 8, 2015.
Office Action from U.S. Appl. No. 29/466,391, dated Oct. 14, 2015.
Examination Report from Taiwanese Patent Appl. No. 100131021, dated Jan. 5, 2016.
Examination from European Patent Appl. No. 12743003.1-1757, dated Jan. 8, 2016.
Notice of Reasons for Rejection from Japanese Patent Appl. No. 2013-543207, dated Feb. 2, 2016.
Examination from European Patent Appl. No. 13 701 525.1-1757, dated Feb. 3, 2016.
Office Action from U.S. Appl. No. 13/189,535; dated Jan. 6, 2016.
Office Action from U.S. Appl. No. 13/341,741; dated Jan. 8, 2016.
Office Action from U.S. Appl. No. 13/873,303; dated Feb. 2, 2016.
Office Action from U.S. Appl. No. 13/464,745, filed Mar. 1, 2016.
Office Action from U.S. Appl. No. 14/716,480, filed Mar. 3, 2016.
Office Action from U.S. Appl. No. 13/368,217, filed Mar. 4, 2016.
Office Action from U.S. Appl. No. 13/189,535, filed Mar. 18, 2016.
Office Action from U.S. Appl. No. 14/020,757, filed Apr. 7, 2016.
Office Action from U.S. Appl. No. 29/466,391, filed May 10, 2016.
Office Action for U.S. Appl. No. 14/020,757; dated Jul. 19, 2016.
Examination Report from Taiwan Application No. 100131021; dated Jul. 21, 2016.
Office Action for U.S. Appl. No. 14/716,480; dated Aug. 26, 2016.
European Summons for Oral Proceedings for Application No. 12743003.1; dated Sep. 2, 2016.
Office Action for U.S. Appl. No. 13/464,745; dated Sep. 7, 2016.
Notice of Completion of Pretrial Re-examination from Japanese Patent appl. No. 2013-543207, dated Jun. 30, 2015.
Pretrial Report from Japanese Appl. No. 2013-543207, dated Jun. 19, 2015.
Decision of Rejection from Chinese Patent Appl. No. 201180052998.4, dated Jul. 16, 2015.
Office Action from U.S. Appl. No. 12/873,303, dated Jun. 22, 2015.
Response to OA from U.S. Appl. No. 12/873,303, dated Aug. 21, 2015.
Office Action from U.S. Appl. No. 13/341,741, dated Jun. 22, 2015.
Office Action from U.S. Appl. No. 13/443,630, dated Jun. 23, 2015.
Response to OA from U.S. Appl. No. 13/443,630, filed Aug. 21, 2015.
Office Action from U.S. Appl. No. 13/189,535, dated Jul. 14, 2015.
Office Action from U.S. Appl. No. 13/453,924, dated Jul. 21, 2015.
Office Action from U.S. Appl. No. 13/442,746, dated Jul. 27, 2015.
Office Action from U.S. Appl. No. 14/020,757, dated Aug. 3, 2015.
First Office Action from Chinese Patent Appl. No. 2012800369142, dated Mar. 26, 2015.
Office Action from U.S. Appl. No. 13/464,745, dated Apr. 2, 2015.
Office Action from U.S. Appl. No. 13/442,746, dated Apr. 28, 2015.
Office Action from U.S. Appl. No. 13/368,217, dated May 13, 2015.
Office Action from U.S. Appl. No. 13/828,348, dated May 27, 2015.
Office Action from Japanese Design Patent Application No. 2011-18570.
Reason for Rejection from Japanese Design Patent Application No. 2011-18571.
Reason for Rejection from Japanese Design Patent Application No. 2011-18572.
Cree LR24 Architectural LED troffer product information, 2 pages, available at www.cree.com/lighting.
International Search Report and Written Opinion for PCT Application No. PCT/US2011/062396, dated Jul. 13, 2012.
U.S. Appl. No. 12/873,303, filed Aug. 31, 2010, Edmond, et al.
U.S. Appl. No. 12/961,385, filed Dec. 6, 2010, Pickard, et al.
Cree's XLamp XP-E LED's, data sheet, pp. 1-17.
Cree's XLamp XP-G Led's, data sheet, pp. 1-12.
U.S. Appl. No. 12/418,796, filed Apr. 6, 2009, Pickard, et al.
U.S. Appl. No. 13/429,080, filed Mar. 23, 2012, Edmond, et al.
U.S. Appl. No. 13/028,946, filed Feb. 16, 2011, Le, et al.
U.S. Appl. No. 13/306,589, filed Nov. 29, 2011, Tarsa, et al.
International Search Report and Written Opinion for Patent Application No. PCT/US2011/001517. dated Feb. 27, 2012.
U.S. Appl. No. 13/649,052, filed Oct. 10, 2012, Lowes, et al.
U.S. Appl. No. 13/649,067, filed Oct. 10, 2012, Lowes, et al.
U.S. Appl. No. 13/207,204, filed Aug. 10, 2011, Athalye, et al.
U.S. Appl. No. 13/365,844.
U.S. Appl. No. 13/662,618, filed Oct. 29, 2012, Athalye, et al.
U.S. Appl. No. 13/462,388, filed May 2, 2012.
U.S. Appl. No. 13/842,150, filed Mar. 15, 2013, Dixon, et al.
U.S. Appl. No. 13/770,389, filed Feb. 19, 2013, Lowes, et al.
U.S. Appl. No. 13/782,820, filed Mar. 1, 2013, Dixon, et al.
XLamp® C family from Cree®, Inc., Product Family Data Sheet, 15 pages.
XLamp® M family from Cree®, Inc., Product Family Data Sheet, 14 pages.
XLamp® X family from Cree®, Inc.. Product Family Data Sheet, 17 pages.
Energy Star® Program Requirements for Solid State Lighting Luminaires, Eligibility Criteria—Version 1.1, final Dec. 19, 2008.
Assist Recommends . . . LED Life for General Lighting: Definition of Life. vol. 1. Issue 1, Feb. 2005.
"IES Approved Method for Measuring Lumen Maintenance of LED light Sources", Sep. 22, 2008, ISBN No. 978-0-87995-227-3. (LM-80).
International Search Report and Written Opinion from PCT Application No. PCT/US2013/021353, dated Apr. 17, 2013.
Search Report and Written Opinion from PCT Patent Appl. No. PCT/US2012/047084, dated Feb. 27, 2013.
Search Report and Written Opinion from PCT Patent Appl. No. PCT/US2012/071800, dated Mar. 25, 2013.
U.S. Appl. No. 12/074,762, filed Mar. 2008, Jacobson, et al.
U.S. Appl. No. 13/442,311, filed Apr. 2012, Lu, et al.
U.S. Appl. No. 13/763,270, filed Feb. 2010, Heeter, et al.
Citadel(tm) SLP Lighting (http://www.slplighting.com/enclosures.html).
Final Rejection issued in Korean Design Appl. No. 30-2011-0038114, dated Jun. 14, 2013.
Final Rejection issued in Korean Design Appl. No. 30-2011-0038115, dated Jun. 14, 2013.
Final Rejection issued in Korean Design Appl. No. 30-2011-0038116, dated Jun. 17, 2013.
International Search Report and Written Opinion from PCT Patent Appl. No. PCT/US2013/035668, dated Jul. 12, 2013.
Notice to Submit a Response from Korean Patent Application No. 30-2011-0038115, dated Dec. 12, 2012.
Notice to Submit a Response from Korean Patent Application No. 30-2011-0038116, dated Dec. 12, 2012.
International Search Report and Written Opinion from Appl. No. PCT/CN2013/072772, dated Dec. 19, 2013.
International Search Report and Written Opinion from PCT/US2013/049225, dated Oct. 24, 2013.
Office Action from U.S. Appl. No. 29/387,171, dated May 2, 2012.
Response to OA from U.S. Appl. No. 29/387,171, filed Aug. 2, 2012.
Office Action from U.S. Appl. No. 12/961,385, dated Apr. 26, 2013.
Response to OA from U.S. Appl. No. 12/961,385, filed Jul. 24, 2013.
Office Action from U.S. Appl. No. 13/464,745, dated Jul. 16, 2013.
Office Action from U.S. Appl. No. 29/368,970, dated Jun. 19, 2012.
Office Action from U.S. Appl. No. 29/368,970, dated Aug. 24, 2012.
Response to OA from U.S. Appl. No. 29/368,970, filed Nov. 26, 2012.
Office Action from U.S. Appl. No. 12/961,385, dated Nov. 6, 2013.
U.S. Appl. No. 14/145,559, filed Dec. 31, 2013, Lui, et al.
U.S. Appl. No. 12/463,709, filed May 11, 2009, Donofrio, et al.

(56) References Cited

OTHER PUBLICATIONS

U.S. Appl. No. 11/656,759, filed Jan. 22, 2007, Chitnis, et al.
U.S. Appl. No. 11/899,790, filed Sep. 7, 2007, Chitnis, et al.
U.S. Appl. No. 12/566,195, filed Sep. 24, 2009, Van de Ven, et al.
U.S. Appl. No. 12/704,730, filed Feb. 12, 2010, Van de Ven, et al.
U.S. Appl. No. 14/145,355, filed Dec. 31, 2013, Van de Ven, e al.
U.S. Appl. No. 13/828,348, filed Mar. 14, 2013, Edmond, et al.
U.S. Appl. No. 13/345,215, filed Jan. 6, 2012, Lu, et al.
White97▌ film Technical Data Sheet from WhiteOptics, LLC of New Castel.
Office Action from U.S. Appl. No. 13/787,727, dated Jan. 29, 2015.
Office Action from U.S. Appl. No. 13/429,080, dated Feb. 18, 2015.
Office Action from U.S. Appl. No. 13/453,924, dated Mar. 10, 2015.
First Official Action from European Patent Appl. No. 12 743 003.1-1757, dated Jan. 16, 2015.
Second Office Action and Search Report from Chinese Appl. No. 2011800529984, dated Dec. 26, 2014.
Grant Notice from European Appl. No. 13701525.1, dated Nov. 19, 2014.
International Report and Written Opinion from PCT/US2013/049225, dated Jan. 22, 2015.
Office Action from U.S. Appl. No. 13/828,348, dated Nov. 20, 2014.
Office Action from U.S. Appl. No. 12/873,303, dated Nov. 28, 2014.
Office Action from U.S. Appl. No. 13/464,745, dated Dec. 10, 2014.
Office Action from U.S. Appl. No. 13/341,741, dated Dec. 24, 2014.
Office Action from U.S. Appl. No. 13/189,535, dated Jan. 13, 2015.
Decision of Rejection from Japanese Appl. No. 2013-543207, dated Nov. 25, 2014.
Office Action from Mexican Appl. No. 100881. dated Nov. 28, 2014.
Grant Notice from European Appl. No. 13701525.1-1757, dated Nov. 24, 2014.
Preliminary Report on Patentability from PCT/US2013/035668, dated Oct. 14, 2014.
Office Action from U.S. Appl. No. 13/442,746, dated Sep. 15, 2014.
Office Action from U.S. Appl. No. 13/429,080, dated Sep. 16, 2014.
Office Action from U.S. Appl. No. 13/844,431, dated Oct. 10, 2014.
Office Action from U.S. Appl. No. 13/443,630, dated Oct. 10, 2014.
Office Action from U.S. Appl. No. 13/368,217, dated Oct. 22, 2014.
Office Action from U.S. Appl. No. 12/961,385, dated Nov. 6, 2014.
Office Action from U.S. Appl. No. 13/453,924, dated Nov. 7, 2014.
Office Action from U.S. Appl. No. 13/464,745, dated Jul. 16, 2014.
Communication from European Patent Appl. No. 13701525.1-1757, dated Sep. 26, 2014.
International Preliminary Report on Patentability and Written Opinion from PCT/US2013/021053, dated Aug. 21, 2014.
International Preliminary Report on Patentabiliby from PCT/US2012/071800 dated Jul. 10, 2014.
Office Action from U.S. Appl. No. 13/189,535, dated Jun. 20, 2014.
Office Action from U.S. Appl. No. 13/453,924, dated Jun. 25, 2014.
Office Action from U.S. Appl. No. 13/443,630, dated Jul. 1, 2014.
Reasons for Rejection from Japanese Patent Appl. No. 2013-543207. dated May 20, 2014.
First Office Action from Chinese Patent Appl No. 2011800529984. dated May 4, 2014.
Office Action from U.S. Appl. No. 13/544,662, dated May 5, 2014.
Office Action from U.S. Appl. No. 13/844,431, dated May 15, 2014.
Office Action from U.S. Appl. No. 13/341,741, dated Jun. 6, 2014.
Office Action from U.S. Appl. No. 13/429,080, dated Apr. 18, 2014.
Office Action from U.S. Appl. No. 12/961,385, dated Mar. 11, 2014.
Preliminary Report and Written Opinion from PCT Appl. No. PCT/US2012/047064, dated Feb, 6, 2014.
Office Action from U.S. Appl. No. 12/961,385, dated Nov. 27, 2015.
Office Action from U.S. Appl. No. 13/828,348, dated Nov. 4, 2015.
Office Action from U.S. Appl. No. 14/020,757, dated Nov. 24, 2014.
First Office Action from Chinese Patent Appl. No. 2011800588770, dated Sep. 25, 2015.
Office Action for Chinese Patent Application No. 2011800588770; dated Sep. 26, 2016.
Notification of Reexamination for Chinese Application No. 2011800529984; dated Oct. 10, 2016.
Office Action for U.S. Appl. No. 13/828,348; dated Oct. 17, 2016.
Office Action for European Application No. 11754767.9; dated Oct. 31, 2016.
Office Action for U.S. Appl. No. 12/873,303; dated Nov. 25, 2016.
Notice of Allowance for Taiwan Application No. 100131021; Dated Nov. 28, 2016.
Office Action for U.S. Appl. No. 13/368,217; dated Jan. 3, 2017.
Office Action for U.S. Appl. No. 14/225,327; dated Mar. 14, 2017.
European Notice of Allowance for Application No. 12743003.1; dated Mar. 17, 2017.
Office Action for U.S. Appl. No. 13/189,535; dated Mar. 23, 2017.
Office Action for U.S. Appl. No. 13/464,745; dated Mar. 23, 2017.
Foreign Office Action for Chinese Application No. 2011800529984; dated Apr. 5, 2017.
Office Action for U.S. Appl. No. 14/721,806; dated Apr. 21, 2017.
Office Action for U.S. Appl. No. 13/443,630; Dated May 18, 2017.
Office Action for U.S. Appl. No. 13/828,348; dated Jun. 2, 2016.
Notice of Reason for Rejection for Japanese Appl. No. 2013-543207; dated May 24, 2016.
Second Office Action for Application No. 2011800588770; dated Mar. 29, 2016.
Office Action from U.S. Appl. No. 13/464,745, dated Mar. 1, 2016.
Office Action from U.S. Appl. No. 14/716,480, dated Mar. 3, 2016.
Office Action from U.S. Appl. No. 13/368,217, dated Mar. 4, 2016.
Office Action from U.S. Appl. No. 13/169,535, dated Mar. 18, 2016.
Office Action from U.S. Appl. No. 14/020,757, dated Apr. 7, 2016.
Office Action from U.S. Appl. No. 29/466,391, dated May 10, 2016.
Office Action for U.S. Appl. No. 14/170,627, dated Jun. 16, 2017.
Office Action for U.S. Appl. No. 14/716,480, dated Jul. 5, 2017.
Office Action for U.S. Appl. No. 12/873,303, dated Aug. 9, 2017.
Office Action for U.S. Appl. No. 13/828,348, dated Sep. 1, 2017.
Office Acton for U.S. Appl. No. 14/225,327, dated Oct. 2, 2017.
Office Action for U.S. Appl. No. 13/189,535, dated Oct. 30, 2017.
Office Action for U.S. Appl. No. 14/721,806, dated Nov. 1, 2017.

* cited by examiner

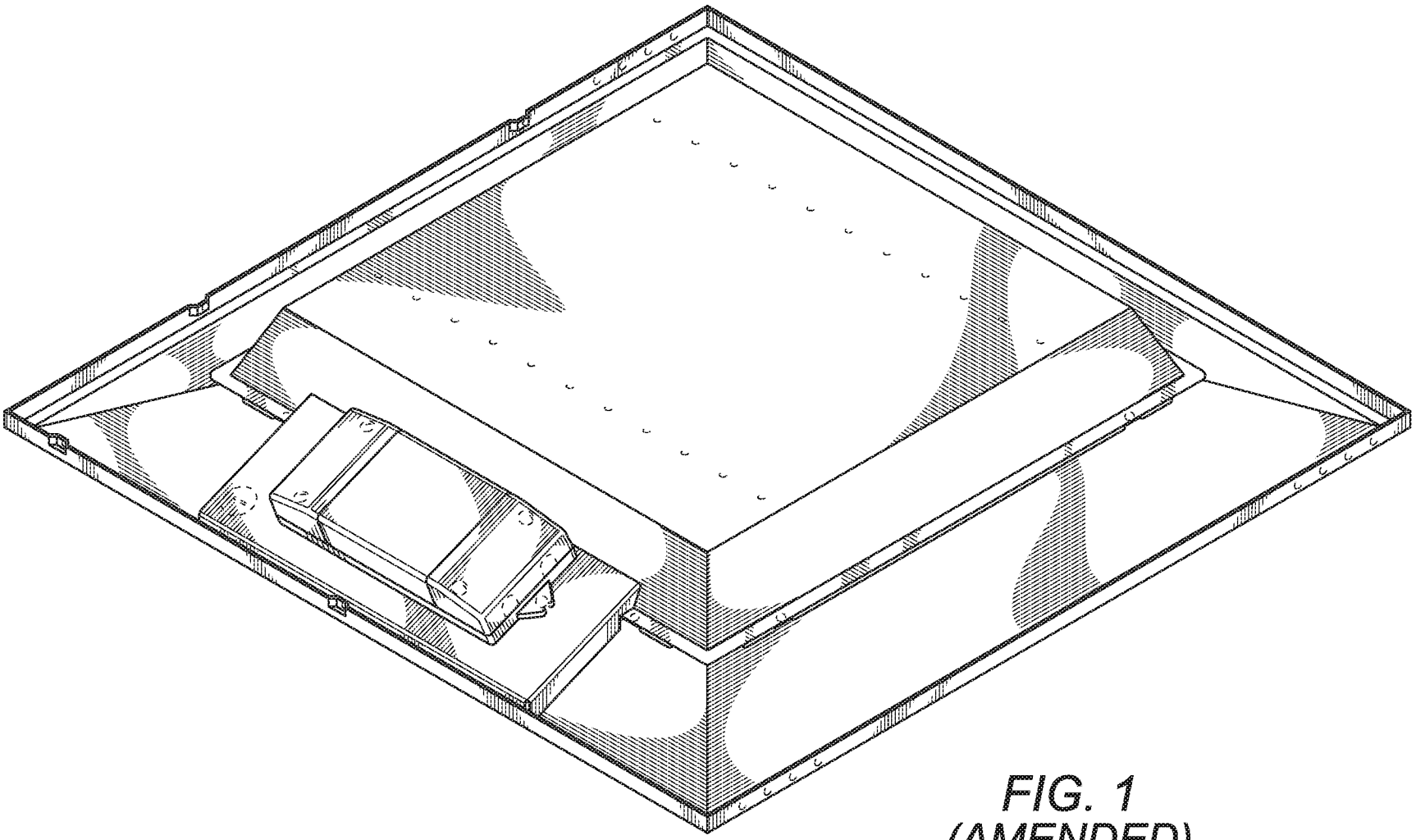
FIG. 1
(AMENDED)